Dec. 13, 1927. 1,652,448
O. MARTIENSSEN
FIRE DAMP INDICATOR
Filed March 8, 1924
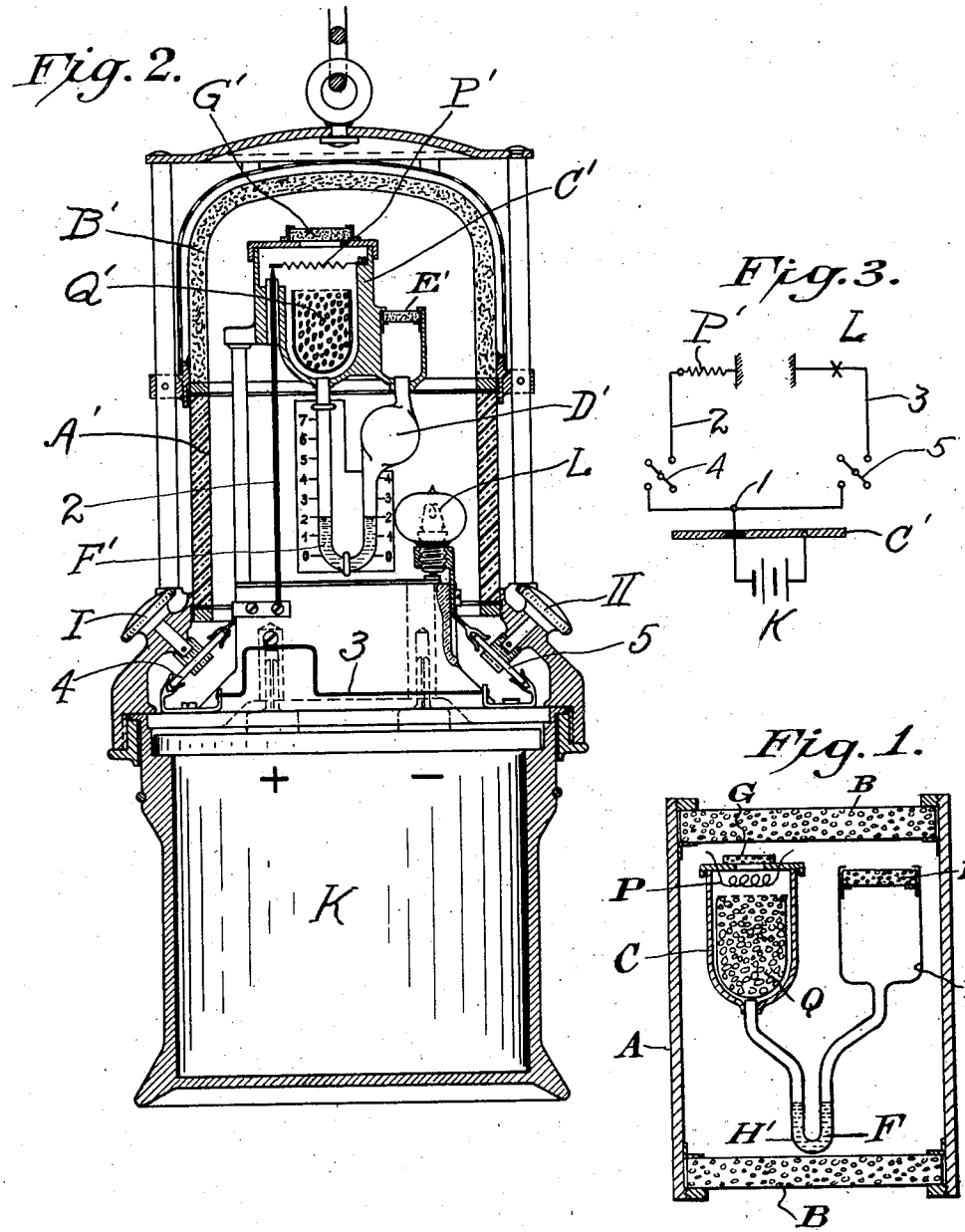

Patented Dec. 13, 1927.

UNITED STATES PATENT OFFICE.

OSCAR MARTIENSSEN, OF KIEL, GERMANY.

FIRE-DAMP INDICATOR.

Application filed March 8, 1924, Serial No. 697,972, and in Germany March 26, 1923.

This invention relates to fire-damp indicators and its object is to produce apparatus of this kind which is entirely safe and certain in operation.

The arrangement of a good fire-damp indicator should be such that an admixture of 2% methane in the air may be noticed with certainty in order that precautionary measures can be taken before an explosive mixture of 5% exists. Another desideratum is that the fire-damp indicator should be made in the form of an easily transportable, strong and simple instrument which may be used by the miners in coal mines at their work. These objects are difficult to accomplish on account of the great inactivity of methane both in a physical and chemical sense. Although there are a great number of laboratory appliances for indicating the smallest quantities of methane, safe appliances suitable for use in mines have not hitherto become known.

In accordance with the present invention the drawbacks in known apparatus are overcome by employing for the indication of methane very simple but entirely novel means which consists in first converting the methane into a substance whose existance can be more easily perceived chemically and physically, and in indicating the presence of said substance by the apparatus. The methane is most easily converted by burning it. As is well known a complete combustion may be accomplished by placing a glowing platinum wire into the gas mixture that contains the methane. Of course, precautionary measures must be taken to prevent the occurrence of an explosion in the apparatus itself through said combustion. These measures consist in causing the combustion to take place in a chamber into which the gas mixture is obliged to enter through a porous stone. By this means all risks of an explosion are precluded. By this combustion in the combustion chamber one part of methane and two parts of oxygen give two parts of water and one part of carbonic acid gas. For determining the carbonic acid gas produced and for ascertaining therefrom the composition of the gas mixture various means and methods may be employed.

In accordance with the present invention the carbonic acid gas and the water vapour are absorbed in the well known manner by potash solution or a similar substance and the lowering of the pressure due to this absorption is used for measuring the quantity of gas absorbed and thus the quantity of methane burned. In order that this alteration of pressure may be considerable and that the change of the methane content to an extent of one per cent may be capable of measurement, it is necessary for the porosity of the stone to be very small. This porosity should only be sufficient to allow a quantity of gas mixture to enter that is completely burned by the wire and under these conditions a constant lowering of pressure during the continuous combustion will be obtained in the combustion chamber.

In a fire-damp indicator of this kind a difficulty is however encountered in that the wire at which the combustion takes place tends to become fragile. This is due to the fact that any material which on the whole may be suitable for the purpose, such as platinum, is liable when heated to form compounds with the carbon liberated during the combustion of methane. The use of a thicker wire to overcome this drawback is not feasible because this would entail the use of a larger battery of accumulators (such as shown at K in Figures 2 and 3) which would make the apparatus cumbersome.

This difficulty is overcome by the present invention through coating the wire with a thin layer of ceria or some other suitable oxide which prevents the wire from combining with carbon, but which does not interfere with the combustion of the methane by the glowing wire.

Another means of making the wire less liable to break consists in preventing the wire from being heated in the first instance to a needlessly high temperature. Experiments have shown that a sufficient combustion of methane takes place if the wire is heated only to a bright red heat, but that a deterioration of the wire by the absorption of carbon is only liable to occur if it is heated to a white heat.

Even with the aforesaid improvements a fire-damp indicator would be dangerous to use in practical mining, because if the apparatus were broken through carelessness the combustion started in the apparatus would continue in the external atmosphere and give rise to a fire-damp explosion. To obviate this the apparatus is enveloped in an external chamber whose walls partly consist of stone which is very pervious to gas. It has been found that a gas mixture which is generally highly explosive, when ignited in such a chamber, does not produce an explosive effect and does not give rise to a continuous flame.

My invention is illustrated in the accompanying drawings, in which,

Figure 1 represents a central vertical section thru an apparatus of the character contemplated;

Figure 2 is a vertical section of another embodiment of my invention; and

Figure 3 is a wiring diagram of the electric circuits for parts represented in Figure 2.

Referring to Figure 1 of the drawings, A is a cylindrical wall closed at both ends by walls B consisting of very porous stone. The stones B thru which the mine gases enter the housing of the fire damp indicator, may be such highly porous stones as those generally known as "sponge stone." These porous stones may be made of clay fired without glazing. During the kneading process, however, sawdust or other suitable filler is added, such saw-dust being consumed during the firing operation in such a way as to produce a highly porous product. A substitute for the above described "sponge stone" may be had by sintering together coarse granules of glass, which, during the sintering operation, fuse together slightly to form a porous mass.

In order to give an idea as to the degree of porosity of the stones used in accordance with the application it may be stated that cigar smoke may be blown thru them without noticeable resistance. The smoke jet is hardly dispersed by the stone. If such a stone is held over a gas burner, the gas burns without difficulty above the stone as soon as it is lighted above the stone. The flaring back of the flame, however, such as is possible in case of an ordinary wire netting, is not possible with the stone. If there is a mixture of air and methane in a chamber of this kind and the methane admixture amounts to about 7% a white hot wire may be placed in the chamber without the slightest noticeable effect being produced. The methane burns steadily at the incandescent wire and the air and methane are converted into water and carbonic acid gas without any flame and without a rise of pressure. If the methane content is 7 to 11% and the platinum wire is brought to incandescence by means of a battery K (see Figure 3), a small bluish flame is formed for a moment but the flame immediately disappears again without any further visible result. This sequence of events in the container C is due to the fact that the very porous stone walls B at opposite ends of housing A do not allow of such rises of pressure as are necessary for the production of explosive ignitions of gas mixtures in said container. On the other hand the products of combustion, particularly the carbonic acid, can only pass through the stone G so gradually that an incipient flame becomes extinguished immediately and thus obviates any continuous flash. In consequence the walls of the container C do not become hot as does the wire netting in a Davy safety lamp under similar conditions.

Enclosed in the housing A, B is a container C of metal to the bottom of which is connected a thick-walled glass tube H. The other end of this glass tube terminates in a wide extension or chamber D, which is closed by a very porous stone E. The glass tube includes a U-shaped bend H' which contains an indicating medium in the form of colored water column F or the like. The top of the container C has an opening which is blocked by a piece of stone G of relatively little porosity. Beneath the inlet or window covered by the stone G is a platinum helix P which is adapted to be heated sufficiently by current from accumulator K to bring about a conversion of the methane and air. The space beneath the helix in the container C is filled by a body Q that contains a substance such as potash solution that absorbs carbonic acid gas and water. It should be noted that the stone G above the platinum spiral P is comparatively dense, whereas the stone E which closes the enlarged portion D of the pressure gauge tube (to be hereinafter referred to), has the same property as the first mentioned stone B, namely, high porosity. The relatively high and low degrees in porosity as between the stones G and E, is for the purpose of building up a pressure difference after the methane has been consumed on the platinum spiral and after the carbon dioxide and water formed during combustion have been absorbed, said pressure difference being readable along the branches of the U-shaped gauge tube.

If an apparatus of this kind is placed in air mixed with methane, the liquid F in the two limbs of the U-shaped indicator tube will remain at the same levels if the air does not contain more than one to two percent carbonic acid gas. But if the platinum helix P is made to glow the methane entering the container C through the porous stone G will be burned at the wire and the carbonic acid gas and water then formed will be absorbed by the potash solution in the body Q. Consequently a lowering of the pressure in the container C with respect to the external atmosphere will take place and the liquid in the left hand tube will rise. The difference of the heights of the liquids in the limbs of the glass tube is a measure of the content of methane in the air. If the methane content is greater than 3% and the platinum helix is only heated after the apparatus has been brought into the atmosphere containing this amount of methane, an explosion will occur in the container C which will be more or less violent according to the amount of methane present and which will press the liquid upward in the right hand limb of the tube at the moment the platinum wire is heated. The liquid in the right hand limb however immediately drops again and rises in the left hand limb to an extent corresponding to the content of methane in the air.

The highly porous stone E which allows sufficient gas to penetrate into the space D to maintain a pressure in the same equal to that of the surrounding atmosphere also serves to restrict the explosion to the chamber D when the latter is too violent in the container C and consequently expels the liquid entirely from the tube F. In such cases the methane burns quietly in the chamber D. The carbonic acid gas formed during the combustion prevents the entrance of further oxygen and causes the flame to extinguish in a fraction of a second. Hence no heating of the stone E occurs and the combustion does not extend to the content of the chamber A. This can only happen in cases in which the inner parts of the apparatus are injured, but in such cases the same events occur in the chamber A which have just been described in connection with the chamber D and the stones B render a propagation of the explosion to the surrounding atmosphere impossible.

Referring now to Figures 2 and 3, my improved fire-damp indicator with its battery may be embodied in the form of portable apparatus somewhat similar to an electric mining lamp. According to this embodiment of my invention, an accumulator K has its positive pole connected at 1 to a conductor comprising branches 2 and 3 leading, respectively, to a platinum helix P' and an electric lamp L, said platinum helix and electric lamp as well as the negative pole of accumulator K, being grounded in the metal frame of the fire-damp indicator. Switches 4 and 5 may be included in branches 2 and 3 of the conductor, said switches being operated by knobs I and II for controlling the energizing of these elements. As shown in Figure 2, a cylindrical wall A' is surmounted by a dome B' of porous material. A metal container C' is arranged within said dome B' said container being charged with a mass Q which absorbs carbonic acid gas and water. The top wall of container C' is provided with an opening covered by a stone slab G' of low porosity similar to that shown in Figure 1. A U-tube indicator F' has one branch thereof connected up with container C', the other branch of said U-tube being connected up to a widened extension chamber D' which is closed above by a porous stone E'. It will be understood from this description that the battery employed in energizing helix P', may also be used for supplying current to the lamp L so that the entire apparatus will form a combined fire-damp indicator and mine lamp.

I claim:—

1. In a fire-damp indicator, a container provided with an inlet-opening, means for continuously admitting a restricted quantity of a combustible gaseous mixture to said container, means within said container for completely burning the gaseous mixture admitted thereto, means arranged within said container for absorbing, continuously, the products of combustion due to the burning of said gaseous mixture, a chamber open to the pressure of the surrounding atmosphere, and pressure-responsive means connected up to said container and chamber for indicating the difference in pressure therein due to the continuing absorption of combustion products by said absorbing means.

2. In a fire-damp indicator, a container provided with an inlet-opening, a closure for said inlet-opening, said closure being adapted to admit only a limited amount of a combustible gaseous mixture to said container, means within said container for burning the gaseous mixture admitted thereto, means arranged within said container for absorbing products of combustion derived from the burning of the gaseous mixture, a chamber provided with a closure adapted to permit free passage of the gaseous mixture but to prevent the passage of flame, and a differential pressure gauge connected to said container and chamber for indicating the methane content by the absorption of combustion products derived from said gaseous mixture.

3. In a fire-damp indicator, the combination with a container provided with means for admitting a limited flow of gaseous mixture, a hot wire within said container, an electric accumulator connected up to said hot wire for completely burning a combustible gaseous mixture admitted to said container, a body of absorbent material arranged within said container for absorbing the products of combustion due to the burning of said gaseous mixture, a chamber open to the pressure of the surrounding atmosphere, and a U-shaped gauge-tube having its branches connected respectively to said container and chamber, said gauge-tube being provided with a liquid column for indicating the difference in pressures due to the absorption of combustion products by said absorbing body.

4. In a fire-damp indicator, a container provided with an inlet-opening, a closure for said inlet-opening having a relatively low degree of porosity for limiting the amount of a combustible gaseous mixture admitted to said container, means within said container for burning the gaseous mixture admitted thereto, means arranged within said container for absorbing the products of combustion due to the burning of the gaseous mixture, a chamber provided with a closure having a relatively high degree of porosity, and a pressure gauge connected at one end to said container and at its other end to said chamber, said gauge being provided with means for indicating the difference in pressure between said container and said chamber due to the combustion of gaseous mixture and the absorption of combustion products by said absorbing means.

5. In a fire-damp indicator, a container provided with an inlet-opening, a closure for said inlet-opening having a relatively low degree of porosity for limiting the amount of a combustible gaseous mixture admitted to said container, a hot wire within said container for burning gaseous mixture admitted thereto, said wire being provided with a ceria oxide coating, a battery for energizing said wire, means for absorbing products of combustion due to the burning of gaseous mixture, a chamber provided with a closure having a relatively high degree of porosity, and a gauge connected at one end to said container and at its other end to said chamber, for indicating the difference in pressure between said container and said chamber.

6. In a fire-damp indicator, the combination with a container, having an inlet for gaseous mixture, said inlet being provided with a porous closure for restricting the ingress of gaseous mixture and the egress of products of combustion, of a hot wire arranged within said container for burning a combustible gaseous mixture admitted to said container thru said closure, said hot wire being coated with ceria to prevent the formation of carbon compounds between elements of said wire and gaseous mixture, material within said container for absorbing products of combustion, said absorbent material being capacitated to continuously and completely absorb the products of combustion derived from the gaseous mixture burnt by said hot wire, and pressure-responsive means for measuring the decrease in pressure of the gaseous mixture in said container due to its combustion and the absorption of said products of combustion.

7. In a fire-damp indicator, the combination with a housing having an inlet-opening provided with a closure of material having a relatively high degree of porosity, of a container arranged in said housing, said container having an inlet-opening provided with a closure constructed of material having a relatively low degree of porosity, means in said container for burning a combustible gaseous mixture admitted thereto, means in said container for continuously and completely absorbing the products of combustion due to the burning of said gaseous mixture, a tube connected to said container, said tube having a portion of enlarged cross section forming a chamber with an opening communicating with the interior of said housing, a closure for the opening in said chamber and constructed of material having a relatively high degree of porosity, said tube being provided with a U-bend interposed between said container and chamber, and a liquid column in said U-bend for indicating the difference in pressures therein due to the combustion of gaseous mixture and consumption of products of combustion in said container.

In testimony whereof I affix my signature.

OSCAR MARTIENSSEN.